(12) United States Patent
Green, Sr. et al.

(10) Patent No.: US 6,334,045 B1
(45) Date of Patent: *Dec. 25, 2001

(54) SATELLITE BROADCAST RECEIVING AND DISTRIBUTION SYSTEM

(75) Inventors: James A. Green, Sr.; Austin S. Coker, Jr., both of Tallahassee, FL (US)

(73) Assignee: Global Communications, Inc., Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/621,464

(22) Filed: Jul. 21, 2000

Related U.S. Application Data

(63) Continuation of application No. 09/001,484, filed on Dec. 31, 1997, now Pat. No. 6,122,482, which is a continuation-in-part of application No. 08/838,677, filed on Apr. 9, 1997, now Pat. No. 5,805,975, which is a continuation-in-part of application No. 08/394,234, filed on Feb. 22, 1995, now abandoned.

(51) Int. Cl.⁷ .............................. H04H 1/00; H04B 7/185
(52) U.S. Cl. .......................................... 455/3.02; 455/12.1
(58) Field of Search .................................. 455/3.01, 3.02, 455/3.03, 3.04, 12.1, 427, 428, 14, 20, 22, 179.1

(56) References Cited

U.S. PATENT DOCUMENTS

| | | |
|---|---|---|
| 3,324,417 | 6/1967 | Garner . |
| 3,665,316 | 5/1972 | Jeffers . |
| 3,730,980 | 5/1973 | Kirk, Jr. . |
| 3,936,594 | 2/1976 | Schubin et al. . |
| 4,023,104 | 5/1977 | Rheinfelder . |
| 4,066,966 | 1/1978 | Takeuchi et al. . |
| 4,130,801 | 12/1978 | Prygoff . |
| 4,183,054 | 1/1980 | Patisaul et al. . |
| 4,395,734 | 7/1983 | Rypkema . |
| 4,419,768 | 12/1983 | Yamashita et al. . |
| 4,429,418 | 1/1984 | Hooper . |
| 4,439,740 | 3/1984 | Harrington . |

(List continued on next page.)

FOREIGN PATENT DOCUMENTS

| | | |
|---|---|---|
| 3623581C1 | 4/1988 | (DE) . |
| 41 26 774 | 1/1993 | (DE) . |
| 2119192A | 11/1983 | (GB) . |
| 2-140022 | 11/1988 | (JP) . |
| 0309032 | 12/1988 | (JP) . |
| 5-344014A | 12/1993 | (JP) . |

OTHER PUBLICATIONS

Baylin, "Digital Satellite TV" (5th Ed. 1997), pp. 92–93 and 159–163.

U.S. application No. 60/068,589, filed Dec. 23, 1997.

(List continued on next page.)

Primary Examiner—Nguyen T. Vo
(74) Attorney, Agent, or Firm—Nixon & Vanderhye PC

(57) ABSTRACT

The present invention provides for a satellite system that will permit for signals of two different frequencies and polarities to be transmitted simultaneously over the same cable. The system will accommodate two different polarity commands from two or more different sources at the same time. The satellite system of the present invention includes a satellite dish or antenna that receives signals. These received signals are transmitted to a converter. A head-in frequency processor is coupled to the converter. This head-in frequency processor enables the different frequencies and polarities to be transmitted simultaneously via a single coaxial cable. This single coaxial cable is coupled to a head-out receiver processor which is connected to a receiver. This receiver is connected to a TV or other source. This unique design and configuration provides for a system that will permit satellite broadcast reception in locations that are not in the line-of-sight path of the satellites. Accordingly, the satellite system of the present invention will permit satellite broadcasting to high-rise buildings, hospitals, condominiums, schools, and the like.

10 Claims, 1 Drawing Sheet

U.S. PATENT DOCUMENTS

| | | |
|---|---|---|
| 4,484,218 | 11/1984 | Boland et al. . |
| 4,486,773 | 12/1984 | Okubo . |
| 4,512,033 | 4/1985 | Schrock . |
| 4,513,315 | 4/1985 | Dekker et al. . |
| 4,527,136 | 7/1985 | Kamiya . |
| 4,530,008 | 7/1985 | McVoy . |
| 4,532,543 | 7/1985 | Groenewegen . |
| 4,538,174 | 8/1985 | Gargini et al. . |
| 4,538,175 | 8/1985 | Balbes et al. . |
| 4,542,300 | 9/1985 | Nagatomi . |
| 4,545,048 | 10/1985 | Hauk et al. . |
| 4,545,075 | 10/1985 | Miller et al. . |
| 4,556,988 | 12/1985 | Yoshisato . |
| 4,558,358 | 12/1985 | Onda . |
| 4,580,161 | 4/1986 | Petrus et al. . |
| 4,586,081 | 4/1986 | St. Arnuad et al. . |
| 4,592,093 | 5/1986 | Ouchi et al. . |
| 4,605,968 | 8/1986 | Hayashi . |
| 4,608,710 | 8/1986 | Sugiura . |
| 4,648,123 | 3/1987 | Schrock . |
| 4,677,686 | 6/1987 | Hustig et al. . |
| 4,709,418 | 11/1987 | Fox et al. . |
| 4,710,972 | 12/1987 | Hayashi et al. . |
| 4,761,825 | 8/1988 | Ma . |
| 4,761,827 | 8/1988 | Horton et al. . |
| 4,866,787 | 9/1989 | Olesen . |
| 4,901,367 | 2/1990 | Nicholson . |
| 5,045,823 | 9/1991 | Nichols, III . |
| 5,073,930 | 12/1991 | Green et al. . |
| 5,216,432 | 6/1993 | West . |
| 5,225,799 | 7/1993 | West et al. . |
| 5,276,904 | 1/1994 | Mutzig et al. . |
| 5,303,403 | 4/1994 | Leong . |
| 5,331,332 | 7/1994 | West et al. . |
| 5,345,591 | 9/1994 | Tsurumaki et al. . |
| 5,437,051 | 7/1995 | Oto . |
| 5,440,319 | 8/1995 | Raymond et al. . |
| 5,488,659 | 1/1996 | Miliani . |
| 5,666,126 | 9/1997 | Lange . |
| 5,682,426 | 10/1997 | Miliani et al. . |
| 5,737,698 | 4/1998 | Gabrelian et al. . |
| 5,752,180 * | 5/1998 | Guo et al. ............................... 455/3.2 |
| 5,793,258 | 8/1998 | Lange . |
| 5,805,975 * | 9/1998 | Green, Sr. et al. ................. 455/12.1 |
| 5,898,455 | 4/1999 | Barakat et al. . |

OTHER PUBLICATIONS

"Private Cable Update" Dec. 1997.

Shrader, Robert L., *Electronic Communication*, Fifth Edition, p. 398.

Konishi, et al., "Satellite Broadcasting," 89 *SMPTE Journal*, No. 3, pp. 162–166 (Mar. 1980), First Printed Dec. 1978.

Grant, "Direct Broadcast from Lower Power Satellites," 81 Proceedings of the IEEE International Conf. on Comm., pp. 26.1.1–16.1.5, (Jun. 1981).

Cooper, "How to Build a Satellite TV Receiver," *Radio Electronics* (1981).

Douville, "A 12–GHz Low–Cost Earth Terminal for Direct TV Reception from Broadcast Satellites," IEEE Proceedings on Consumer Electronics (1977).

Jurgen, "Chasing Japan in the HDTV Race," 26 *IEEE Spectrum*, No. 10, pp. 26–30 (Oct. 1989).

Tannas Jr., "HDTV Displays in Japan: Projection–CRT Systems on Top," *IEEE Spectrum*, 0018–9235/89/1000–0031, pp. 31–33 (Oct. 1989).

Dinsel, "Die Verteilung von Fernseh–Satelliten–Signalen in Kabelnetzen," *Fernseh–Und Kino–Technik,* vol. 39, No. 1, Berlin, Germany, (Jan. 1985).

Brücke zum Kunden, Neue UKW–Kanalumsetzer übertragen viele Programme in bester Stereo–Qualität für grosse Germeinschafts–Antennenanlagen, Eckar Germany (1973).

Mussino, "Reception and Distribution Techniques for DBS Signals in Community Antenna Installations," *Alta Frequenza,* vol. 55, No. 2, Milano Italy (Apr. 1986).

"Broadband Communication Agile Processor 362HL," cadco Inc., 1990 Catalog, 6 pages.

White Papers, "SDTV Satellite Distribution Television System for Multiple Dwelling Units," www.foxcom.com, 6 pages (©1997–1999).

Foxcom, "About Us," 2 pages (©1997–1999).

* cited by examiner

SATELLITE BROADCAST RECEIVING AND DISTRIBUTION SYSTEM

This application is a continuing application which claims priority under 35 USC Section 120 from each of the following prior applications: application Ser. No. 09/001,484, filed Dec. 31, 1997, now U S. Pat. No. 6,122,482; which is a continuation-in-part of application Ser. No. 08/838,677, filed Apr. 9, 1997, now U.S. Pat. No. 5,805,975; which is a continuation-in-part of application Ser. No. 08/394,234, filed Feb. 22, 1995, now abandoned.

BACKGROUND OF THE INVENTION

1. Field of the Invention

The present invention relates generally to a satellite broadcasting receiving and distribution system, and more particularly to a broadcasting receiving and distribution system that will allow for the transmission of vertical and horizontal (or left-hand circular and right-hand circular) polarization signals simultaneously via a single coaxial cable.

2. Description of the Prior Art

Satellite broadcasting has become very popular throughout the United States. Conventionally, broadcast signals are transmitted through an artificial satellite at very high frequencies. These frequencies are generally amplified and are processed by a satellite receiving arrangement after being received by an antenna or antennas, and prior to application to a conventional home television set or the like.

The satellite receiving arrangement is generally composed of an outdoor unit generally associated with the antenna and an indoor unit generally associated with the television set or the like. The outdoor and indoor units are coupled via a coaxial cable.

As an example, U.S. Pat. No. 5,301,352 issued to Nakagawa et al. discloses a satellite broadcast receiving system. The system of Nakagawa et al. includes a plurality of antennas which, respectively, include a plurality of output terminals. A change-over divider is connected to the plurality of antennas and has a plurality of output terminals. A plurality of receivers are attached to the change-over divider for selecting one of the antennas. Though this system does achieve one of its objects by providing for a simplified satellite system, it does, however, suffer a major shortcoming. This system is silent as to any means of simultaneously transmitting vertical and horizontal polarized signals via a single coaxial cable.

U.S. Pat. No. 5,206,954, issued to Inoue et al. discloses yet another satellite system that includes an outdoor unit that is connected to a channel selector. In this embodiment, the satellite signal receiving apparatus receives vertically and horizontally polarized radiation signals at the site of a receiving antenna. The signals are then transmitted, selectively to provide for either one of the vertically or horizontally polarized signals to be transmitted. This design and configuration provides for one coaxial cable to be utilized, but does not provide for the vertical and horizontal signals to be transmitted simultaneously, but rather, selectively.

None of these previous efforts, however, provide the benefits intended with the present invention. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides a satellite broadcast receiving and distribution system that will permit for the transmission of vertical and horizontal (or left-hand circular and right-hand circular) polarization signals simultaneously via a single coaxial cable. The system of the present invention will accommodate two different polarity commands from two or more different sources at the same time. This satellite broadcast receiving and distribution system of the present invention will provide for the signals received from the satellite to be converted to frequencies which the present day amplifiers can transport. This will permit the signals to travel via existing wiring in buildings, high-rises, hospitals, and the like so that satellite broadcasting can be viewed by numerous individuals by way of a single satellite antenna.

The satellite broadcast system consists of a satellite antenna which receives the polarized signals. These polarized signals are transmitted to a head-in processor and are converted to different frequencies in order to render the different signals to be transmitted simultaneously. Hence, the head-in processor will permit for the transmission of signals of two different frequencies and polarities to be transmitted simultaneously, and will also accommodate two different polarity commands from two or more different television receivers at the same time via a single cable. This cable is coupled to a head-out processor. These signals, once in the head-out processor, will be converted to frequencies that are required for the source (i.e. television). Once converted, the signals are transmitted to a satellite receiver. This satellite receiver is coupled to the source.

Accordingly, it is the object of the present invention to provide for a satellite broadcast receiving and distribution system that will convert different frequencies and different polarized signals in order to permit the signals to be transmitted via a single coaxial cable.

It is another object of the present invention to provide for a satellite broadcast receiving and distribution system that will provide service to mid/high-rise office buildings, condominiums, schools, hospitals and the like via a single cable.

A further object of the present invention, to be specifically enumerated herein, is to provide a satellite broadcast receiving and distribution system in accordance with the preceding objects and which will conform to conventional forms of manufacture, be of simple construction and easy to use so as to provide a system that would be economically feasible, long lasting and relatively trouble free in operation.

The present invention meets the requirements of the simplified design, compact size, low initial cost, low operating cost, ease of installation and maintainability, and minimal amount of training to successfully employ the invention.

An example embodiment of the present invention provides a satellite broadcasting system comprising a satellite dish coupled to a low-noise block converter. The low-noise block converter is coupled to a first means of converting vertical polarization signals and horizontal polarization signals (or left-hand circular polarization signals and right-hand circular polarization signals) from a satellite, and transmitting both polarity signals simultaneously via a single coaxial cable. This enables two different frequencies and polarities to be transmitted simultaneously via a single coaxial cable.

The example embodiment further includes a second means coupled to the first means. The second means converts the vertical polarization signals and the horizontal polarization signals (or said left-hand circular polarization signals and the right-hand circular polarization signals) from the first means to frequencies for a source. A satellite receiver is coupled to the second means. The source is coupled to the satellite receiver.

The example embodiment further includes a power source coupled to the first means. The power source powers the first means.

In accordance with a further aspect of the invention, the second means provides for the signals to be converted separately and independently to the satellite receiver by a transmitting means. The present invention in one of its aspects further provides a transmitting means for the signals to be selectively converted to the satellite receiver via a first cable coupled to the second means.

In accordance with a further aspect of the invention, the transmitting means further includes a polarity switch for permitting the signals to be selectively converted to the satellite receiver.

In accordance with a still further aspect of the invention, the first means includes a first converting system for converting the signals of a first direction to a desired first frequency and polarization, and a second converting system for converting the signals of a second direction to a desired second frequency and polarization. The first converting system may include a first down converter which is coupled to an amplifier. The second converting system may include an up converter coupled to a second down converter. A joining means may be coupled to the amplifier and the second down converter. The joining means may include a four way splitter. A phase lock loop transmitter may be coupled to the four way splitter.

In accordance with a further aspect of the invention, the second means includes a splitting means to split and divide the signals from the single coaxial cable to enable the signals to be transmitted to a first converting system and a second converting system. The first converting system may convert the signals of a first direction to a desired first frequency and polarization for the satellite receiver. The second converting system may convert the signals of a second direction to a desired second frequency and polarization for the satellite receiver. The first converting system may include a first up converter which is coupled to a splitting means and a first down converter. The first down converter may be coupled to the satellite receiver via a first line. The second converting system may include a second up converter coupled to the splitting means. The second up converter may be coupled to the satellite receiver via a second line. The splitting means may include a four way splitter. A phase lock loop receiver may be coupled to the four way splitter.

In accordance with a further aspect of the invention, a first converting system includes a first up converter which is coupled to a splitting means and to a first down converter. The first down converter may be coupled to a joining means. The second converting system may include a second up converter coupled to the splitting means and to the joining means. A polarity switch may be coupled to the first down converter and the second up converter. The polarity switch may be coupled to a first cable which is coupled to the satellite receiver.

In accordance with a further aspect of the invention, the splitting means and the joining means each include a four way splitter, and a phase lock loop receiver is coupled to the spitting means. The splitting means may split and divide signals from the single coaxial cable to enable said signal to be transmitted to a third converting system for converting the signals of said first direction and a fourth converting system for converting the signals of the second direction.

The third converting system includes a second up converter which is coupled to the splitting means and to a third down converter. The third down converter may be coupled to the satellite receiver via a first conduit. The fourth converting system may include a third up converter coupled to the splitting means. The third up converter is also coupled to the satellite receiver via a second conduit.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments, in addition to the scope of the invention defined by the claims taken in conjunction with the accompanying drawings.

DESCRIPTION OF THE PREFERRED EMBODIMENTS

Figure 1:
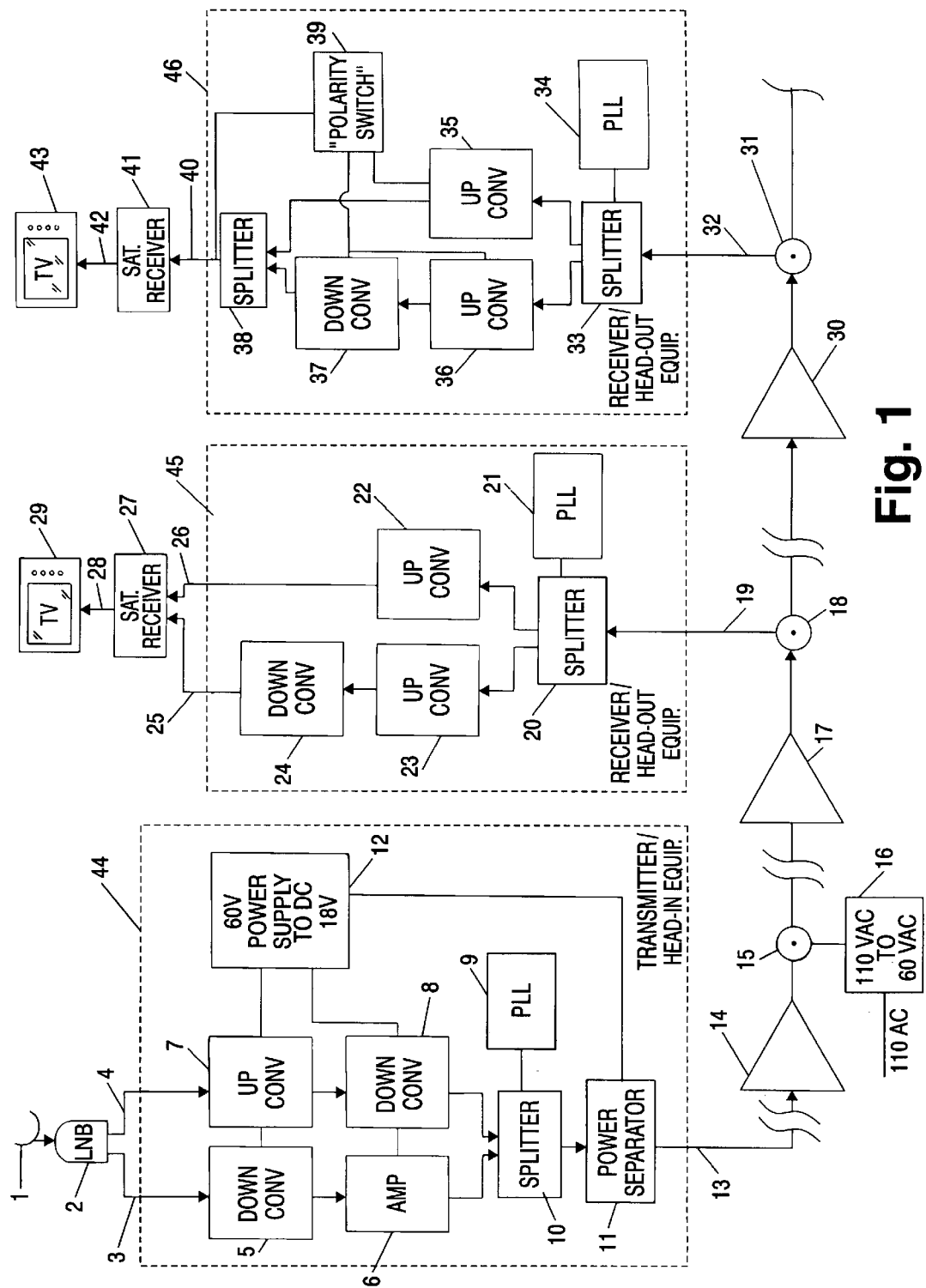
FIG. 1 illustrates a block diagram representing the satellite broadcast signal receiving and distribution system according to the present invention.

As illustrated in FIG. 1, the satellite system of the present invention includes a receiving satellite antenna 1 that is connected to a head-in equipment frequency processor 44. It is at this head-in equipment frequency processor 44 where the signals (Vertical-polarized signals and Horizontal-polarized signals; or left-hand circular and right-hand circular polarization signals) are received simultaneously and then transmitted via a single coaxial cable 13 to the head-out receiver processor 45 or 46. From the receiver processor 45 or 46, the signals are transported to a satellite receiver 27 or 41 and to a television 29 or 43.

As illustrated, the receiving satellite antenna 1 is connected to a low-noise block converter (LNB) 2 for amplifying and converting the respective polarized signals (Vertical-polarized signals and Horizontal-polarized signals; or left-hand circular and right-hand circular polarization signals). This LNB converter 2 is coupled to the head-in equipment frequency processor 44. Accordingly, after signals are received, they pass the low-noise block converter 2, to provide for the signals to enter the head-in equipment frequency processor 44 (illustrated in dashed lines) via lines 3 and 4.

The head-in equipment frequency processor 44 provides for the signals via lines 3 and 4 to be converted to the frequencies which the present day amplifiers can transport via converters 5 and 7, respectively. From the lines 3 and 4, the signals or transponders are transmitted to a first converter or down converter 5 and a second converter or up converter 7, respectively. These frequency converters convert the entered frequencies to frequencies which the present day amplifiers can transport.

The utilization of two converters permits for the acceptance of two signals or polarized transponders that are of a different frequency.

In the down converter 5, the transponders are converted down to a specified frequency. This specified frequency is the frequency that is required for the present day amplifiers to transport. The newly converted frequencies are amplified through the amplifying means 6. At means 6, the converted frequencies are amplified so as not to create second harmonics. These signals are then transferred to a four way splitter 10.

In the up converter 7, the transponders are converted up to a specified frequency. The converted frequencies then are converted down via down converter 8. This process of converting up and then down provides for frequencies to be converted without difficulties and avoiding any forbidden conversion area.

The converted signals are transferred to the four way splitter 10 in order to combine the frequency of the amplified signal of amplifier 6 and the frequency from converter 8. To synchronized the system, the frequencies from the phase lock loop (PLL) transmitter 9 are transmitted to the splitter 10.

From splitter 10, the signals are passed through an A.C. power separator 11. Block 12 routes 60 Volts power to a D.C. power supply of 18 Volts.

This will permit for the dual frequencies from the satellite dish 1 to be transmitted simultaneously via a single coaxial cable 13. Dependent upon the length of the cable, an optional amplifier 14 can be coupled thereto. Power from a power source 16 is inserted into the lines via a power inserter 15. The signals are amplified, as needed, with an additional amplifier 17. It is noted that the amplifiers are optional and are dependent to the distance that the head-in frequency processor 44 is located from the head-out receiver processor 45 or 46. The power supply and power source 12 energizes the head-in frequency processor 44.

From the single coaxial cable 13, the signals are adjusted via a tap 18 or 31 to permit for the appropriate power level (decibels) that is required for the head-out receiver processor 45 or 46.

The head-out frequency processor 45 can take the form of a plurality of embodiments. The design and configuration of the head-out frequency processor 45 is dependent on the source (TV 29) in combination with the satellite receiver 27.

The first embodiment for the head-out receiver processor is illustrated in FIG. 1 and is represented by way of dashed lines 45. As seen in this head-out receiver processor 45, the simultaneously transmitted signals enter the processor 45 via line 19. The line 19 is coupled to a four (4) way splitter 20. A phase locked loop (PLL) receiver 21 is coupled to the splitter 20 to permit for the signals to be locked to the proper and desired frequencies. From the splitter, the first frequency is transmitted to a first converter 22 in order to permit signals or transponders to be converted up to a specified frequency. This up converted signal is then transmitted to the satellite receiver 27 by way of a line 26.

The second frequencies are transmitted to a first or up converter 23 and then is transmitted to a second or down converter 24. This will permit for the signals to be converted to the desired frequency. The conversion of the signals from up to down provides the benefit of converting the frequencies without any mishap or error. This method of conversion will avoid the forbidden conversion area. This second or down converter 24 is coupled to the satellite receiver 27 via line 25. The signals received from the satellite 1 can then be transmitted to the TV (source) 29 by line 28.

As illustrated, this head-out receiver processor 45 is the reverse process of the head-in processor 44. This is to provide for the signals to reconvert to their original frequencies so as to provide for the satellite receiver and TV (source) to accept the signals. The single cable 13 accepts the signals at frequencies different than that of the TV (source) 29 and satellite receiver 27. Accordingly the head-out receiver processor 45 must reconvert the signals to the frequencies that are utilized by the TV (source) 29 and satellite receiver 27. This design and configuration of the head-out receiver processor is dependent on the design and configuration of the satellite receiver 27.

An alteration of the satellite receiver 27 requires an alteration in the head-out receiver processor. This alteration is illustrated in FIG. 1 and is shown in outline and designated as reference 46. In this design and configuration, the satellite receiver 41 utilizes only one wire 40 and accepts only one type of signals at a time, such as left-hand circular polarized signals or right-hand circular polarized signals.

As seen, the frequencies are tapped via 31. The tap 31 is coupled to the head-out receiver processor 46 via line 32 which is connected to a four (4) way splitter 33. To provide for the signals to be locked in proper frequencies, the four way splitter 33 is coupled to a phase locked loop (PLL) receiver 34.

From the splitter 33, the first signal is transmitted to a first or up converter 36, and then is transmitted to a second or down converter 37. The conversion of the signals from up to down provides the benefit of converting the frequencies without any mishap or error. This method of conversion will avoid the forbidden conversion area.

The signals from the splitter 33 are transmitted to an up converter 35 which will inherently convert the signals.

A polarity switch 39 is connected to converters 35, 36, 37 in order to permit for the head-out receiver processor to be coupled to the satellite receiver 41 via a single cable 40 and a joining means 38 which is a four (4) way splitter. The satellite receiver 41 is connected by way of line 42 to a TV (source) 43.

It is noted that FIG. 1 illustrates the use of two head-out receiver processors, but in actuality, only one head-out receiver processor need be utilized with the head-in processor 44. The type and embodiment for the head-out receiver processor is dependent on the combination of the satellite receiver and TV (source) that are utilized.

The satellite system of the present invention will permit for two signals of different frequency and derived from different polarities to travel simultaneously via a single coaxial cable. The use of this satellite system will provide for a satellite system that is versatile, economical, and compact. The usage of the single cable permits for a system that can accept satellite broadcasting in places that were previously rendered impossible. These places includes mid/high-rise office buildings, condominiums, hospitals, schools, etc. The unique design and configuration enables the signals to be transmitted via the existing wiring of the buildings. The only renovations that may need to be done is the upgrading of the existing amplifiers.

While the invention has been particularly shown and described with reference to an embodiment thereof, it will be understood by those skilled in the art that various changes in form and detail may be made without departing from the spirit and scope of the invention.

We claim:

1. A method of distributing satellite signals received by a satellite antenna via a coaxial cable to a satellite receiver coupled to an end of said coaxial cable, said coaxial cable also having a further end, said method comprising:

receiving, with a satellite antenna, a first block of signals having a first polarization and second block of signals having a second polarization;

frequency converting at least said first received block of signals to a different frequency band;

simultaneously applying said frequency-converted first block of signals and said second block of signals to the coaxial cable;

simultaneously communicating said frequency-converted first block of signals and said second block of signals through the cable;

recovering the frequency-converted first block of signals and the second block of signals from the cable;

further frequency converting said recovered first block of signals to a frequency range the satellite receiver can receive; and switching, under control of said satellite receiver, between said further frequency-converted first block of signals and said second block of signals for application to said satellite receiver.

2. The method of claim 1 wherein said switching step comprises operating an electrical switch.

3. A method of distributing broadcast signals received from an artificial satellite comprising:

receiving a first polarized block of signals and a second polarized block of signals from the artificial satellite;

frequency converting at least one of said first block of signals and said second block of signals to different frequencies;

after processing by the frequency converting step, applying said first or second block of signals with said converted block of signals to a coaxial cable such that the same coaxial cable carries both said blocks of signals simultaneously;

recovering both said blocks of signals from the coaxial cable; and further frequency converting said converted block of signals to a frequency range a satellite receiver can receive; and selecting between said first block of signals and said second block of signals for application to the satellite receiver.

4. The method as in claim 3 wherein said selecting step comprises electrically switching between said first block of signals and said second block of signals for application to said satellite receiver.

5. The method of claim 3 wherein said satellite receiver alternately uses first polarity type signals or second polarity type signals at a time, and said selecting step selects only the first polarity block of signals or second polarity block of signals at a time for application to said satellite receiver.

6. The method of claim 3 wherein said satellite receiver is coupled via a wire to an input source, and said selecting step selects between said first block of signals and said second block of signals for application to said wire.

7. The method of claim 3 wherein said frequency converting step comprises a down conversion.

8. The method of claim 3 wherein the frequency converting step comprises an up conversion.

9. The method of claim 3 wherein the frequency converting step comprises a down conversion followed by an up conversion.

10. The method of claim 3 further including further frequency converting said at least one of said first block of signals and second block of signals for application to said satellite receiver.

* * * * *

(12) INTER PARTES REEXAMINATION CERTIFICATE (1103rd)
United States Patent
Green, Sr. et al.

(10) Number: US 6,334,045 C1
(45) Certificate Issued: *May 8, 2015

(54) SATELLITE BROADCAST RECEIVING AND DISTRIBUTION SYSTEM

(75) Inventors: James A. Green, Sr., Tallahassee, FL (US); Austin S. Coker, Jr., Tallahassee, FL (US)

(73) Assignee: GLOBAL COMMUNICATIONS, INC., Tallahassee, FL (US)

Reexamination Request:
No. 95/002,105, Aug. 27, 2012

Reexamination Certificate for:
Patent No.: 6,334,045
Issued: Dec. 25, 2001
Appl. No.: 09/621,464
Filed: Jul. 21, 2000

( * ) Notice: This patent is subject to a terminal disclaimer.

Related U.S. Application Data

(63) Continuation of application No. 09/001,484, filed on Dec. 31, 1997, now Pat. No. 6,122,482, which is a continuation-in-part of application No. 08/838,677, filed on Apr. 9, 1997, now Pat. No. 5,805,975, which is a continuation-in-part of application No. 08/394,234, filed on Feb. 22, 1995, now abandoned.

(51) Int. Cl.
| | |
|---|---|
| *H04H 1/00* | (2006.01) |
| *H04B 7/185* | (2006.01) |
| *H04N 7/10* | (2006.01) |
| *H04N 7/20* | (2006.01) |
| *H04H 40/90* | (2008.01) |
| *H04H 20/63* | (2008.01) |

(52) U.S. Cl.
CPC ............... *H04H 40/90* (2013.01); *H04H 20/63* (2013.01)

(58) Field of Classification Search
None
See application file for complete search history.

(56) References Cited

To view the complete listing of prior art documents cited during the proceeding for Reexamination Control Number 95/002,105, please refer to the USPTO's public Patent Application Information Retrieval (PAIR) system under the Display References tab.

*Primary Examiner* — Karin Reichle

(57) ABSTRACT

The present invention provides for a satellite system that will permit for signals of two different frequencies and polarities to be transmitted simultaneously over the same cable. The system will accommodate two different polarity commands from two or more different sources at the same time. The satellite system of the present invention includes a satellite dish or antenna that receives signals. These received signals are transmitted to a converter. A head-in frequency processor is coupled to the converter. This head-in frequency processor enables the different frequencies and polarities to be transmitted simultaneously via a single coaxial cable. This single coaxial cable is coupled to a head-out receiver processor which is connected to a receiver. This receiver is connected to a TV or other source. This unique design and configuration provides for a system that will permit satellite broadcast reception in locations that are not in the line-of-sight path of the satellites. Accordingly, the satellite system of the present invention will permit satellite broadcasting to high-rise buildings, hospitals, condominiums, schools, and the like.

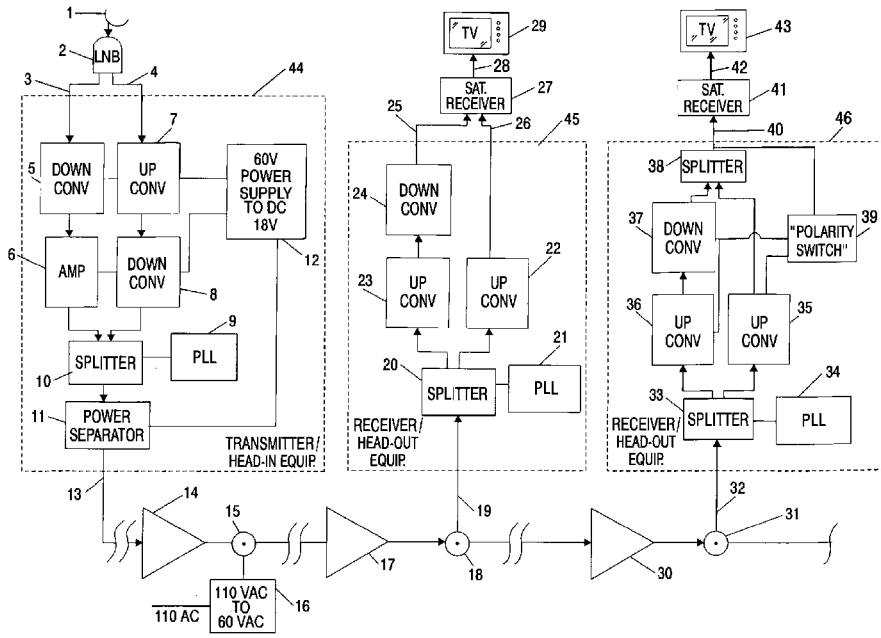

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-10 are cancelled.

\* \* \* \* \*